June 1, 1965 W. E. FOLEY ETAL 3,187,173
ILLUMINATOR COOLING SYSTEM
Filed Nov. 15, 1962 2 Sheets-Sheet 1
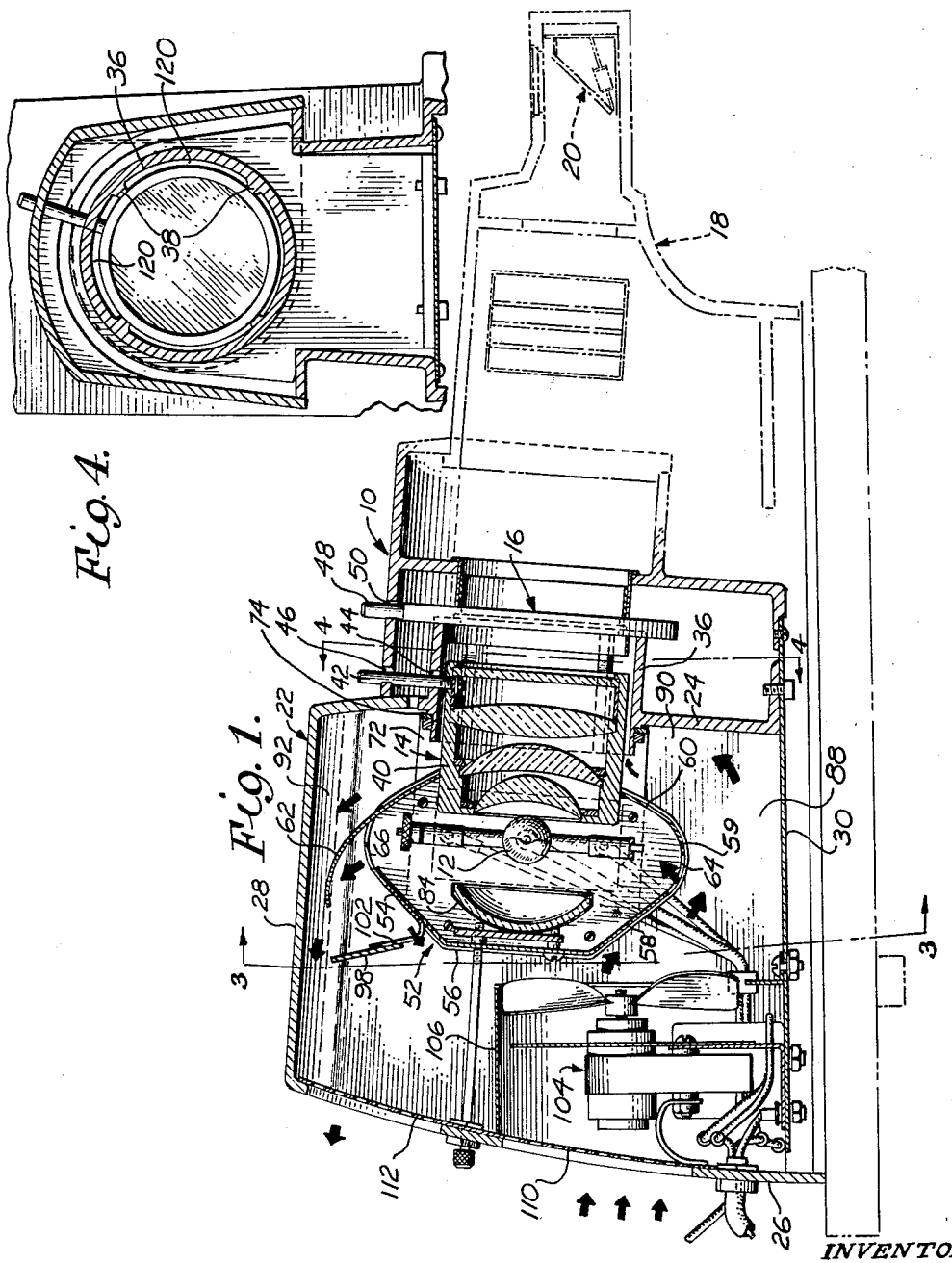
INVENTORS
WILLIAM E. FOLEY &
HENRY T. WILTON
BY
Bean, Brookes, Buckley & Bean
ATTORNEYS

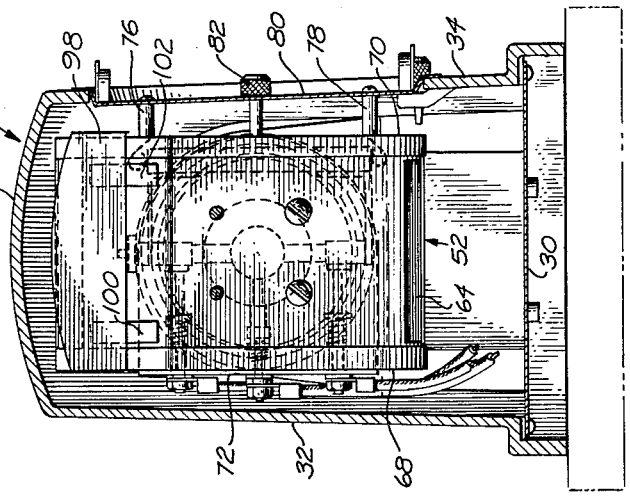
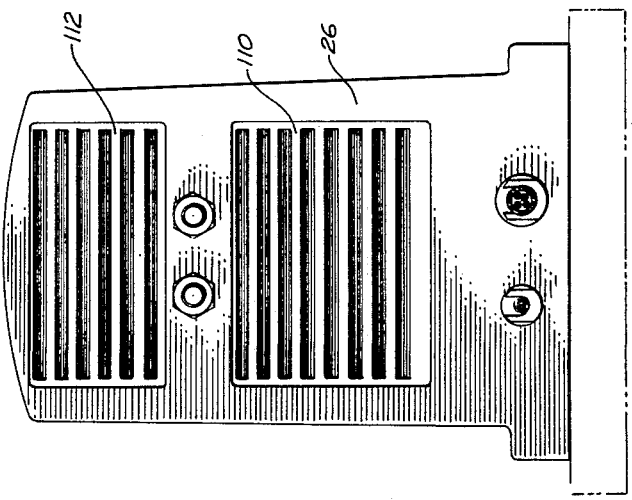

3,187,173
ILLUMINATOR COOLING SYSTEM
William E. Foley and Henry T. Wilton, Buffalo, N.Y., assignors to American Optical Company, Southbridge, Mass.
Filed Nov. 15, 1962, Ser. No. 237,926
2 Claims. (Cl. 240—47)

This invention relates in general to the art of illuminators and pertains in particular to that type of illuminator employing a light source operating at substantially elevated temperature and, specifically, to the construction thereof expressly provided for the purpose of maintaining the outer assemblage cool while the light source remains at proper operating temperature.

By way of example only, it will be appreciated that in some areas of microscopy, it is desirable to illuminate the field being studied with fluorescent light and, for this purpose a source of ultraviolet light is utilized in conjunction with an optical condenser system therefor and suitable directing means, as for example mirrors, so as to direct the ultraviolet light properly with regard to the microscope optical system. Conventionally used ultraviolet light sources operate at relatively high temperatures and due to this fact and the fact also that they may otherwise present a safety hazard as by explosion, the ultraviolet light source is normally disposed within a protected housing which also mounts and contains the other parts of the illuminator system as aforesaid. In accord with the present invention, a high-temperature light source is housed within a separate envelope which is, in turn, housed within the body of the instrument and the envelope cooperates with the housing and with a fan assembly to maintain the light source at proper operating temperature, preventing overheating thereof and, at the same time, maintaining the external body of the instrumentality relatively cool so that no discomfort or danger to the operator results.

It is therefore of primary concern in connection with the present invention to provide improved illuminator means and, in particular, to provide certain improvements in the combination thereof which concerns the mounting and cooling of the component parts of the mechanism.

More specifically, it is an object of the present invention to provide an inner envelope or housing for a high temperature light source in which the envelope is utilized both for the purpose of maintaining the light source at the proper operating temperature and for the purpose of permitting a controlled dissipation of heat so as to prevent the exterior body of the instrumentality from becoming too hot.

Further, it is an object of this invention to provide an assembly as aforesaid wherein a condenser lens system is also so arranged as to provide a maximum of heat dissipation therefrom so as to avoid stresses and distortions of the lens members and elements, providing and maintaining an efficient utilization thereof.

Other objects and advantages of the invention will appear from the description hereinbelow and the accompanying drawing wherein:

FIG. 1 is a vertical longitudinal section taken through an illuminator construction in accordance with the present invention and showing details of the cooling system thereof;

FIG. 2 is a rear elevational view of the assemblage shown in FIG. 1;

FIG. 3 is a vertical section taken substantially along the plane of section line 3—3 in FIG. 1 showing further details of the inner housing or envelope containing the light source; and FIG. 4 is a vertical section taken substantially along the plane of section line 4—4 in FIG. 1 showing details of the cooling system for the condenser lens assembly.

With reference now to FIG. 1, the illuminator is indicated therein generally by the reference character 10 and, in general, includes an ultraviolet or other high temperature light source 12, a condenser lens assembly 14, an iris diaphragm assembly 16 and, as shown in dotted lines, there is provided in the front portion 18 of the assemblage a reflecting mirror 20 for directing the light rays emanating from the condenser system 14 vertically upwardly for disposition relative to an associated microscope not shown. The portion of the assemblage with which the present invention is concerned is shown in full line in FIG. 1 and will be seen to include the housing indicated generally by the reference character 22 which includes the front wall portion 24 and the rear wall 26 as well as the top and bottom wall portions 28 and 30 and, as well, the side walls 32 and 34, see particularly FIG. 3.

The front wall 24 includes an elongate sleeve 36 provided on its inner surface with a series of axially extending and circumferentially spaced ribs 38, see particularly FIG. 4, which slidably receives the condenser lens assembly 14. More particularly, the ribs 38 slidably receive the condenser barrel 40 which serves to mount a series of lens components for collecting and projecting the light from the light source 12 toward the aforesaid reflecting member 20. The barrel 40 is provided with a focusing adjustment rod 42 which projects upwardly therefrom through a suitable cam slot 44 in the sleeve 36 and through a corresponding clearance slot 46 in the housing or body proper, the rod or member 42 being available for manual positioning within the cam slot 44 so as to cause axial sliding of the barrel 40 for focusing purposes as will be readily apparent. There is also provided an adjusting rod 48 on the iris diaphragm assembly 16 projecting through a suitable clearance slot 50 in the body or housing 10. The details of the diaphragm 16 and its manner of adjustment and the manner of adjustment of the condenser lens assembly 14 form no part of the present invention except insofar as it is of interest to the understanding of the hereinafter described invention.

It will be seen that the aforesaid several walls of the housing 22 provide an enclosure within which an envelope assembly indicated generally by the reference character 52 is disposed, the envelope assembly or inner housing 52 serving, in turn, to house therewithin the light source 12 as aforesaid. Preferably, though not necessarily, the envelope 52 is formed from a sheet of material bent around in a manner which will be evident most clearly from FIG. 1 with one end of such sheet or strip forming a deflector portion as hereinafter more particularly pointed out. For example, in accord with the preferred embodiment, the sheet provides a downwardly sloping upper or top wall portion 54 which merges with a rear wall portion 56, thence extends angularly forwardly and downwardly in a bottom or lower wall portion 58 which lower wall portion also includes the arcuate bottom portion 59 merging with the upwardly and forwardly extending front wall portion 60 which extends all of the way to the top of the envelope and has an extension 62 forming a deflector in a manner and for purposes hereinafter more particularly set forth and explained.

At the bottom of the envelope 52, the sheet forming the main body thereof is provided with a cutout or opening 64 and the terminal end portions of the sheet from which the main body portion is made and which provide the aforementioned portions 54 and 62 are separated at the top of the body or envelope to provide the further or top opening 66, substantially as is shown. The opposite sides of the main body of the envelope 52 are closed by flanged side wall members 68 and 70, see particularly FIG. 3, and the envelope proper is largely supported by means of a bracket having a leg portion 72, see FIG. 3, secured to the side wall members 68 and having a further leg 74, see particularly FIG. 1, which is supported directly on the front wall region 24 of the housing 22. Actually, the light source 12 is supported through the medium of the other end wall member 70 which, unlike the end wall member 68, is not joined to the sheet forming main body of the envelope but which is free to move relative thereto in and out as in FIG. 3 and which is supported as by spacer elements and suitable associated fasteners 76 and 78 directly upon a door closure member 80 removably secured to the side wall 34 of the housing assembly 22. Adjustment means 82 is diagrammatically shown which effects vertical and lateral adjustment of the light source 12 within the envelope to properly align the same with the condenser mechanism 14. The details of the door 80, the adjusting means 82 and the specific manner of mounting the light source 12 from the side wall member 70 form no part of the present invention and further description thereof is deemed to be unnecessary. Likewise, although the same is preferably provided in the structure, the details of the reflecting member 84 and its manner of adjustment within the envelope, see particularly FIG. 1, form no part of the present invention and further description thereof is not believed to be necessary.

It will be appreciated that the front wall portion 60 of the envelope is provided with an opening which slidably receives the rearwardly projecting extremity of the barrel 40 of the condenser system 14 so that the same can be moved closer to or further away from the light source 12, for focusing purposes as aforesaid. FIG. 3 clearly illustrates that the side walls 68 and 70 of the envelope 52 are disposed closely adjacent the corresponding side walls 32 and 34 of the housing 22 so that, in effect, the envelope extends laterally between the opposite side walls of the housing 22. On the other hand, as can be seen more clearly in FIG. 1, the relative disposition of the envelope 52 within the housing 22 forms a generally U-shaped air channel or passage between these two entities, the lower leg of the air passage or channel being indicated by reference character 88, the vertical leg thereof being indicated by reference character 90 and the upper or return leg being indicated by reference character 92. The aforementioned deflector 62 will be seen to overlie the upper opening 66 in the envelope and constricts the upper leg 92 of the air channel or passage. The purpose of this construction is to prevent interference with the normal convection which occurs within the envelope 52 by virtue of the heat produced by the light source 12. That is to say, by convection, air will enter the bottom or lower opening 64 in the envelope 52, flow upwardly past and around the light source 12 and thence outwardly through the opening 66. The forced air flow, hereinafter more particularly described, aids somewhat in the convection process by forcing some air directly through the envelope 52 but in order to assure good circulation out of the envelope through the opening 66, the deflector 62 overlies the same and prevents interference from the air flowing in the aforementioned passage or channel such as would otherwise occur in the absence of the deflector 62. Further, a baffle plate 98 is provided rearwardly of both the opening 66 and the deflector 62, the same being supported by a pair of bracket members 100 and 102, see particularly FIG. 3, the baffle plates 98 being for the purpose of providing some back pressure within the aforementioned U-shaped channel or passage.

To provide for forced air circulation, a fan assembly indicated generally by the reference character 104 is provided, the same being conveniently mounted within the housing 22 and provided with a shroud 106 isolating somewhat the upper and lower legs of the air passage or channel. It will be noted that the disposition of the fan means 104 relative to the envelope 92 is such as to impinge air against the lower region of the envelope so as to force the same to follow the aforementioned U-shaped path or passageway for good circulation of air around the envelope. The rear wall 26 of the housing 22 is provided with an upper and lower opening covered by perforate plate means 110 and 112, such openings providing respectively an air inlet in the lower region of the housing 22 and an air outlet in the upper region of the housing 22. The shroud 106 as aforesaid effectively isolates these two regions of the housing 22.

From the above, it will be manifest that the light source 12, operating at a relatively high temperature, will dissipate some of its heat through the air flowing through the envelope 52 and thence carried outwardly of the housing by being co-mingled with the generally U-shaped air flow as aforesaid. Further, the envelope itself will absorb some of the heat from the light source 12 and this heat will be dissipated by the air flowing around the envelope as aforesaid, it being noted that substantially the entire area of the envelope will be "scrubbed" by the cooling air. In this respect, it will be noted that there will be some flow around the sides of the envelope 52 as will be clearly evident from a study of FIG. 3. Furthermore, it will also be appreciated that air flow in the vertical leg of the channel or air passage will effect a considerable cooling of the barrel 40 of the condenser mechanism 14. To further enhance cooling of the condenser assembly, it will be appreciated that the aforementioned ribs 38 in the sleeve 36 will provide natural channels or passages 120, see particularly FIG. 4, allowing some of the air from the interior of the housing 22 to bleed outwardly through these passages and into the forward part of the machine. In any case, the air flow through the entire region of the assemblage will be substantially as is shown by the arrows in FIG. 1, the net effect being to simultaneously permit the light source 12 to operate at the relatively high temperature which is necessary while at the same time maintaining the walls of the housing 22 substantially cool so as to prevent no discomfort or danger to the operator. Further, the condenser assembly 14 is maintained sufficiently cool to properly operate under the conditions extant.

We claim:
1. In an illuminator for microscopes, a housing including front, rear, top, bottom and side walls defining an enclosure with said rear wall having upper and lower openings,
   a condenser lens assembly extending through said front wall and slidably received therein,
   a light chamber envelope mounted within said housing in rearwardly spaced relation to said front wall and having an opening therein receiving the rearward extremity of said condenser lens assembly,
   a light source mounted in said envelope for projecting light through said condenser lens assembly,
   said envelope extending from closely adjacent one of said side walls to closely adjacent the opposite side wall of the housing and being spaced from both the top and bottom walls thereof,
   fan means mounted in said enclosure rearwardly of said envelope and positioned to direct air through said lower opening in the rear wall of the housing against the lower region of said envelope and toward said front wall of the housing whereby to channel incoming air below said envelope, upwardly across the front thereof, and rearwardly over the top thereof toward said upper opening in said rear wall of the housing,
   said envelope having openings in the upper and lower regions thereof to permit restricted air flow upwardly therethrough,
   said envelope having a front wall extension overlying the opening in the upper region of the envelope and spaced below the top wall of the housing.
2. In an illuminator for microscopes, a housing inclulding front, rear, top, bottom and side walls defining an en- closure with said rear wall having upper and lower openings,
   a condenser lens assembly extending through said front wall and slidably received therein,
   a light chamber envelope mounted within said housing in rearwardly spaced relation to said front wall and having an opening therein receiving the rearward extremity of said condenser lens assembly,
   a light source mounted in said envelope for projecting light through said condenser lens assembly,
   said envelope extending from closely adjacent one of said side walls to closely adjacent the opposite side wall of the housing and being spaced from both the top and bottom walls thereof,
   fan means mounted in said enclosure rearwardly of said envelope and positioned to direct air through said lower opening in the rear wall of the housing against the lower region of said envelope and toward said front wall of the housing whereby to channel incoming air below said envelope, upwardly across the front thereof, and rearwardly over the top thereof toward said upper opening in said rear wall of the housing,
   said envelope having openings in the upper and lower regions thereof to permit restricted air flow upwardly therethrough,
   said envelope having a front wall extension overlying the opening in the upper region of the envelope and spaced below the top wall of the housing,
   and a baffle plate substantially coextensive in width with said envelope disposed rearwardly of said front wall extension and the opening which it overlies.

References Cited by the Examiner
UNITED STATES PATENTS

| | | | |
|---|---|---|---|
| 1,966,531 | 7/34 | Tint | 240—47 X |
| 2,236,303 | 3/41 | Skinner et al. | 240—47 X |
| 2,288,345 | 6/42 | De Vry et al. | 240—47 |
| 2,292,966 | 8/42 | Osterberg et al. | 88—24 |
| 2,730,923 | 1/56 | Gorham et al. | 240—2 |
| 2,960,602 | 11/60 | Keurth et al. | 240—9 |
| 3,019,701 | 2/62 | Brueckner et al. | 88—24 |

NORTON ANSHER, *Primary Examiner.*